(12) United States Patent
Lucas

(10) Patent No.: US 11,855,325 B2
(45) Date of Patent: Dec. 26, 2023

(54) FUEL CELL STACK

(71) Applicants: AUDI AG, Ingolstadt (DE);
VOLKSWAGEN AG, Wolfsburg (DE)

(72) Inventor: Christian Lucas, Braunschweig (DE)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 12 days.

(21) Appl. No.: 17/631,753

(22) PCT Filed: Apr. 30, 2020

(86) PCT No.: PCT/EP2020/062047
§ 371 (c)(1),
(2) Date: Jan. 31, 2022

(87) PCT Pub. No.: WO2021/018429
PCT Pub. Date: Feb. 4, 2021

(65) Prior Publication Data
US 2022/0278348 A1    Sep. 1, 2022

(30) Foreign Application Priority Data

Aug. 1, 2019  (DE) .................... 10 2019 211 586.1

(51) Int. Cl.
| | | |
|---|---|---|
| *H01M 8/2485* | (2016.01) | |
| *H01M 8/04014* | (2016.01) | |
| *H01M 8/04089* | (2016.01) | |
| *H01M 8/04119* | (2016.01) | |
| *H01M 8/10* | (2016.01) | |

(52) U.S. Cl.
CPC ..... *H01M 8/2485* (2013.01); *H01M 8/04014* (2013.01); *H01M 8/04097* (2013.01); *H01M 8/04141* (2013.01); *H01M 8/04171* (2013.01); *H01M 2008/1095* (2013.01)

(58) Field of Classification Search
None
See application file for complete search history.

(56) References Cited

U.S. PATENT DOCUMENTS

| | | |
|---|---|---|
| 6,106,964 A | 8/2000 | Voss et al. |
| 2002/0041984 A1 | 4/2002 | Chow et al. |
| 2007/0207371 A1 | 9/2007 | Ushio et al. |
| 2008/0292927 A1* | 11/2008 | An .............. H01M 8/0202 429/431 |

(Continued)

FOREIGN PATENT DOCUMENTS

| | | |
|---|---|---|
| DE | 102009013648 A1 | 9/2009 |
| EP | 2375485 A1 | 10/2011 |
| KR | 101417454 B1 | 7/2014 |

OTHER PUBLICATIONS

International Preliminary Report on Patentability, dated Feb. 1, 2022, for International Patent Application No. PCT/EP2020/062047. (7 pages).

*Primary Examiner* — Haroon S. Sheikh
(74) *Attorney, Agent, or Firm* — Seed IP Law Group LLP

(57) ABSTRACT

A fuel cell stack includes a plurality of fuel cells received between two end plates, at least one end plate of which has flow channels formed therein with ports for the anode fresh gas and the anode exhaust gas as well as ports for the cathode fresh gas and the cathode exhaust gas, wherein a hygroscopic material forms the wall between the ports for the anode exhaust gas and the cathode fresh gas.

9 Claims, 8 Drawing Sheets

(56) References Cited

U.S. PATENT DOCUMENTS

2011/0244342 A1* 10/2011 An ................... H01M 8/2483
429/413
2012/0015261 A1    1/2012 Han et al.
2018/0342744 A1* 11/2018 Lee ................... H01M 8/0263

* cited by examiner

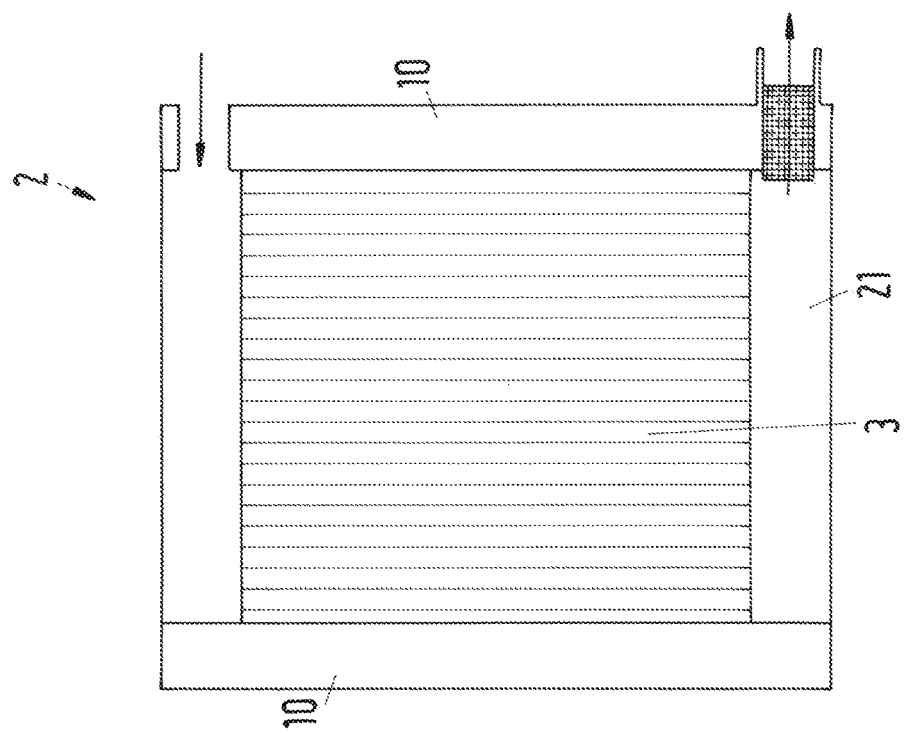
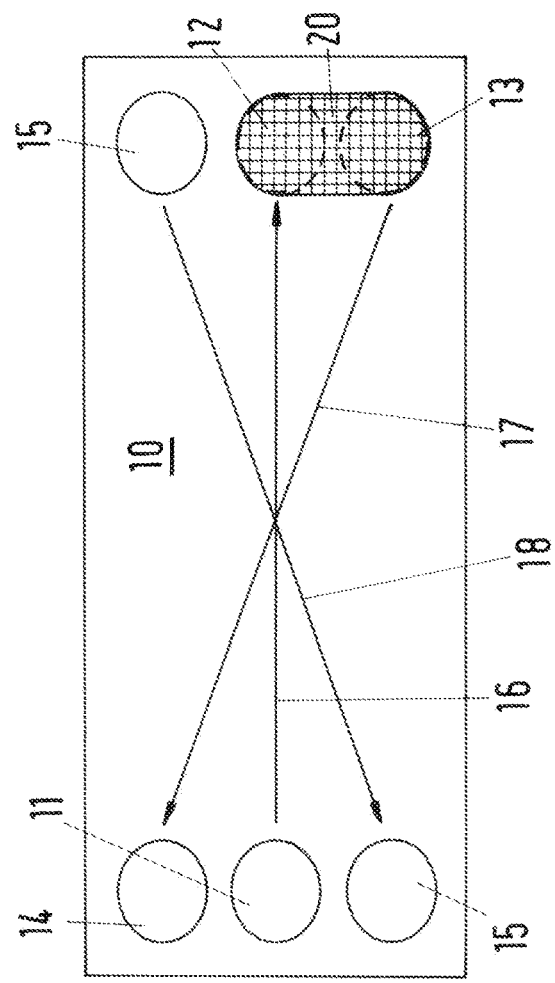
Fig.1
Fig.2

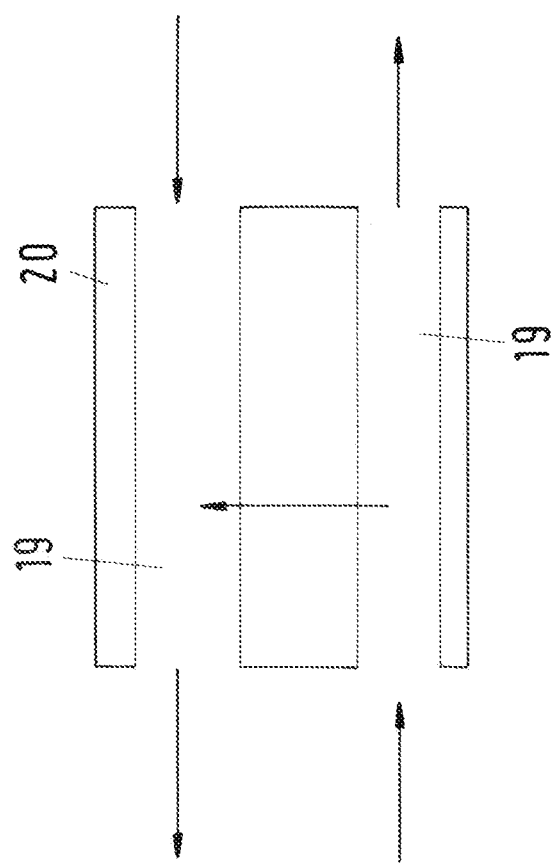

FUEL CELL STACK

BACKGROUND

Technical Field

Embodiments of the invention are formed by a fuel cell stack having a plurality of fuel cells received between two end plates, at least one end plate of which has flow channels formed therein with ports for the anode fresh gas and the anode exhaust gas as well as for the cathode fresh gas and the cathode exhaust gas, wherein a hygroscopic material forms the wall between the ports for the anode exhaust gas and the cathode fresh gas.

Description of the Related Art

Fuel cells are used to provide electrical energy from an electrochemical reaction in which a fuel, usually hydrogen, reacts with an oxidant, usually oxygen, taken from air. To increase performance, it is possible to combine a plurality of fuel cells into a fuel cell stack, in order to, in particular, meet the performance requirements that exist in motor vehicles.

Each of the fuel cells comprises an anode and a cathode as well as a membrane capable of conducting protons, said membrane separating the anode from the cathode, which membrane is permeable to hydrogen nuclei but impermeable to electrons originating from the hydrogen. It is necessary that the membrane has sufficient moisture. Since a sufficient amount of oxygen must be provided for the large number of fuel cells combined in a fuel cell stack, a compressor is used on the cathode side to compress the ambient air with the oxygen contained therein, wherein the air is strongly heated and dried as a result of this compression. Humidifiers and, if necessary, intercoolers are therefore used in a fuel cell device to condition the cathode fresh gas to feed the fuel cell stack with the cathode fresh gas, wherein the humidifier is a large component requiring a large installation space and which increases the complexity of the fuel cell device, as well as the costs required for its manufacture and operation. The humidifier itself is provided with the required moisture from the fuel cell stack, since during the electrochemical reaction the product water is formed from the reactants hydrogen and oxygen, and water is also available on the anode side, which water can be collected in a water separator and regularly or continuously separated.

U.S. Pat. No. 7,923,162 B2 discloses a fuel cell stack in which a heat exchanger is disposed between end plates and the fuel cells to isolate the fuel cell stack from the end plates. The heat exchanger comprises a plurality of plates configured to direct gaseous reactants, exhaust gases, and coolant into and out of the fuel cell stack. The heat exchanger includes regions that allow heat flow from the relatively hot anode exhaust gas to the relatively cold cathode fresh gas, which regions may also be water permeable to allow water transfer from the relatively moist anode exhaust gas to the relatively dry cathode fresh gas for humidification thereof.

WO 2009/092433 A1 describes a fuel cell assembly comprising a first bipolar plate and a second bipolar plate together with a membrane electrode assembly. An anode flow field is formed between the first bipolar plate and the membrane electrode assembly, and a cathode flow field is formed between the second bipolar plate and the membrane electrode assembly. The membrane electrode assembly includes an opening through which anode exhaust gas can be introduced into the cathode fresh gas. It should be noted that the anode exhaust gas also contains unused, potentially recyclable hydrogen, such that for a controlled reaction, including for the adjustment of the temperature of the fuel cells, a control element is arranged in the opening.

US 2011/0171551 A1 likewise describes how cathode waste gas and anode waste gas are mixed together with fresh air in a gas mixture and are post-combusted in a catalytic burner before being returned to the port for the cathode fresh gas.

BRIEF SUMMARY

In some embodiments, a fuel cell stack is designed in such a way that the moisture produced therein can be used more effectively for humidifying the cathode fresh gas.

The fuel cell stack described above is characterized in that in at least one end plate the wall between the port for the anode waste gas and the port for the cathode fresh gas is formed from a hygroscopic material, such that there is a specific design of the end plate in order to be able to use the moisture contained in the anode waste gas for humidifying the cathode fresh gas, wherein it is not necessary to provide additional elements such as a heat exchanger or the like between the fuel cell stack and the end plates themselves. In this fuel cell stack, the wastewater from the anode, which was previously collected and discarded in a separator, is directly used in the fuel cell stack for humidification of the cathode fresh gas, wherein a rapid water transfer is ensured by the short paths through the hygroscopic material. Since the hygroscopic material is integrated into the end plate of the fuel cell stack, installation space is saved, with further advantages in terms of installation space resulting from the fact that the humidifier in a fuel cell device can be made smaller or can even be dispensed with altogether.

The use of hygroscopic material as a wall also ensures that there are separate flow channels for the anode exhaust gas and the cathode fresh gas, which is to say it is ensured that the unused hydrogen contained in the anode exhaust gas does not react with the oxygen contained in the cathode fresh gas, such that the oxygen contained in the cathode fresh gas is available in its entirety for reaction at the membrane electrode arrangement of the fuel cell and undesirable heat generation is avoided. For this purpose, the hygroscopic material may be gas-tight. The hygroscopic material may also be thermally coupled to the end plate such that, if necessary, energy can also be provided for water evaporation.

It is further provided that the ports for the cathode fresh gas and the anode exhaust gas are routed through the hygroscopic material to ensure a compact design.

At least in the end plate having the ports, a flow channel with associated ports for a coolant is formed, which enables the possibility of improved thermal control.

Flow channels for the anode exhaust gas and/or the cathode fresh gas may be formed in the hygroscopic material in a part of its cross-section. It is thus possible to keep the pressure losses in the gas flow from the anode exhaust gas and the cathode fresh gas within acceptable limits via the size and cross-section of the flow channels, and in particular to adjust them via the cross-section of the flow channels.

From a manufacturing point of view, it is advantageous if the end plate is assigned a cover supporting the ports, since this simplifies the shaping of the end plate with the formation of the flow channels and the placement of the hygroscopic material, which hygroscopic material can, for example, be formed by calcium silicate.

The hygroscopic material is sealed from the end plate by a seal so as to have complete control over the movement of the moisture and to ensure its use in the cathode fresh gas.

In some embodiments, the ports for the cathode fresh gas and the cathode exhaust gas are formed on opposite longitudinal sides of the end plate, wherein the hygroscopic material extends parallel to the longitudinal side with the port for the cathode fresh gas and at least partially fills a recycle channel going from the port for the anode exhaust gas to the port for the anode fresh gas. In addition, it is possible to assign a jet pump to the recycle channel such that an anode circuit is integrated in the end plate, thus eliminating the need for its separate design, which again results in installation space advantages.

The features and combinations of features mentioned above in the description as well as the features and combinations of features mentioned below in the description of the figures and/or shown alone in the figures can be used not only in the combination indicated in each case, but also in other combinations or on their own, without leaving the scope of the invention. Thus, embodiments are also to be regarded as encompassed and disclosed by the invention which are not explicitly shown or explained in the figures, but which arise from the explained embodiments and can be generated by means of separate combinations of features.

BRIEF DESCRIPTION OF THE SEVERAL VIEWS OF THE DRAWINGS

Further advantages, features and details will be apparent from the claims, the following description, and the drawings.

FIG. 1 shows a schematic representation of a top view of an end plate, with a symbolization of the flows present in the end plate.

FIG. 2 shows a longitudinal cross-section through a fuel cell stack with fuel cells disposed between two end plates.

FIG. 3 shows a schematic representation of the conditions in the hygroscopic material with the port for the cathode fresh gas, the port for the anode gas and the water transport taking place between the two.

DETAILED DESCRIPTION

Figure 5:
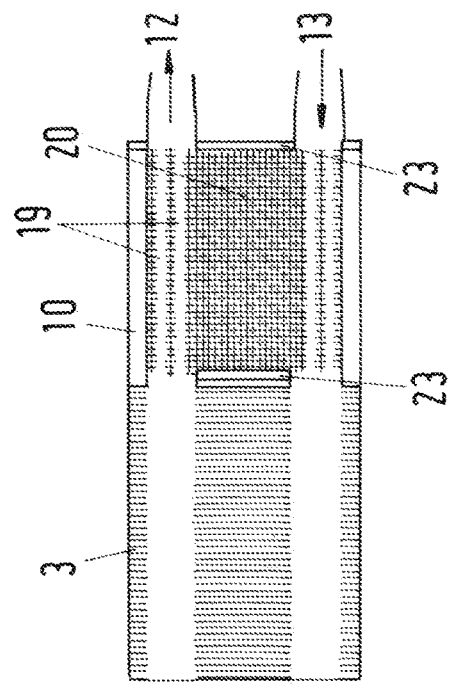
FIG. 5 shows the section V-V of FIG. 4 to illustrate the flow channels for the anode exhaust gas and the cathode fresh gas.

FIG. 1 schematically shows a fuel cell device 1 known from the prior art, which has a fuel cell stack 2 consisting of a plurality of fuel cells 3 connected in series.

Each of the fuel cells 3 comprises an anode and a cathode as well as a proton-conducting membrane separating the anode from the cathode. The membrane is formed out of an ionomer, such as a sulfonated polytetrafluoroethylene (PTFE) or a perfluorinated sulfonic acid (PFSA) polymer. Alternatively, the membrane may be formed as a sulfonated hydro-carbon membrane.

The anodes and/or the cathodes may additionally be admixed with a catalyst, wherein the membranes may be coated on their first side and/or on their second side with a catalyst layer of a noble metal or of mixtures comprising noble metals such as platinum, palladium, ruthenium or the like, which serve as reaction accelerators in the reaction of the respective fuel cell.

Fuel (for example hydrogen) is supplied to the anodes via anode chambers within the fuel cell stack 2. In a polymer electrolyte membrane fuel cell (PEM fuel cell), fuel or fuel molecules are split into protons and electrons at the anode. The membrane allows the protons (for example $H^+$) to pass through, but it is impermeable to the electrons ($e^-$). In so doing, the following reaction takes place at the anode: $2H_2 \rightarrow 4H^+ + 4e^-$ (oxidation/electron release). Whereas the protons pass through the membrane to the cathode, the electrons are routed to the cathode or to an energy storage device via an external circuit. Cathode gas (for example, oxygen or oxygen-containing air) can be supplied to the cathodes via cathode chambers within the fuel cell stack 2, such that the following reaction occurs on the cathode side: $O_2 + 4H^+ + 4e^- \rightarrow 2H_2O$ (reduction/electron capture).

Due to the plurality of fuel cells 3 combined in a fuel cell stack 2, there is a high demand for oxygen, such that the ambient air is compressed by a compressor 4, whereby strongly heated, dry air is present as a result of the given compression. The conditioning of this air to the requirements of the fuel cell 3 occurs in an intercooler 5 and in a humidifier 6 in order to keep the membrane in the fuel cell 3 at the required level of humidity. Humidity is fed to the humidifier 6 from the cathode exhaust gas, wherein the water produced in an anode circuit 7 can also be collected in a water separator 8 and, if necessary, fed to the humidifier 6.

The humidifier 6 is an expensive component requiring a large installation space, such that the intention is to be able to make the humidifier 6 smaller or to dispense with it.

Figure 10:
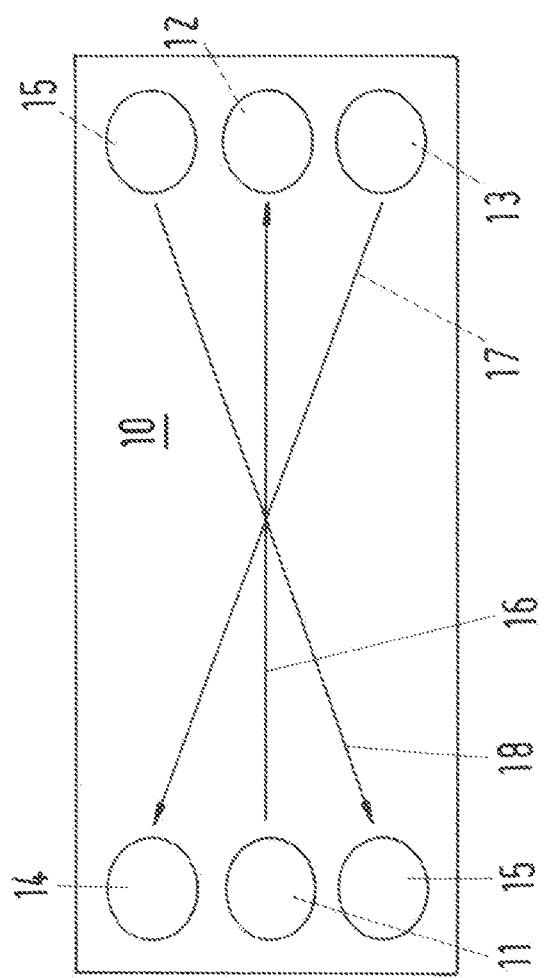
FIG. 10 shows a representation of a prior art end plate corresponding to FIG. 1.

An end plate 10 is shown in FIG. 10, which end plate limits the fuel cell stack 2 on one side, wherein this end plate 10 has a port 11 for the anode fresh gas and a port 12 for the anode exhaust gas, which ports are connected by a flow channel 16. Furthermore, ports 13, 14 are formed for the cathode fresh gas and the cathode exhaust gas, which ports in turn are connected by a flow channel 17. Lastly, there is also the possibility that the end plate 10 has ports 15 for a coolant, which in turn are connected by a further flow channel 18. With this end plate 10, a clearly structured, separated flow of the individual fluids required for the reaction in the fuel cell 3 takes place.

Figure 9:
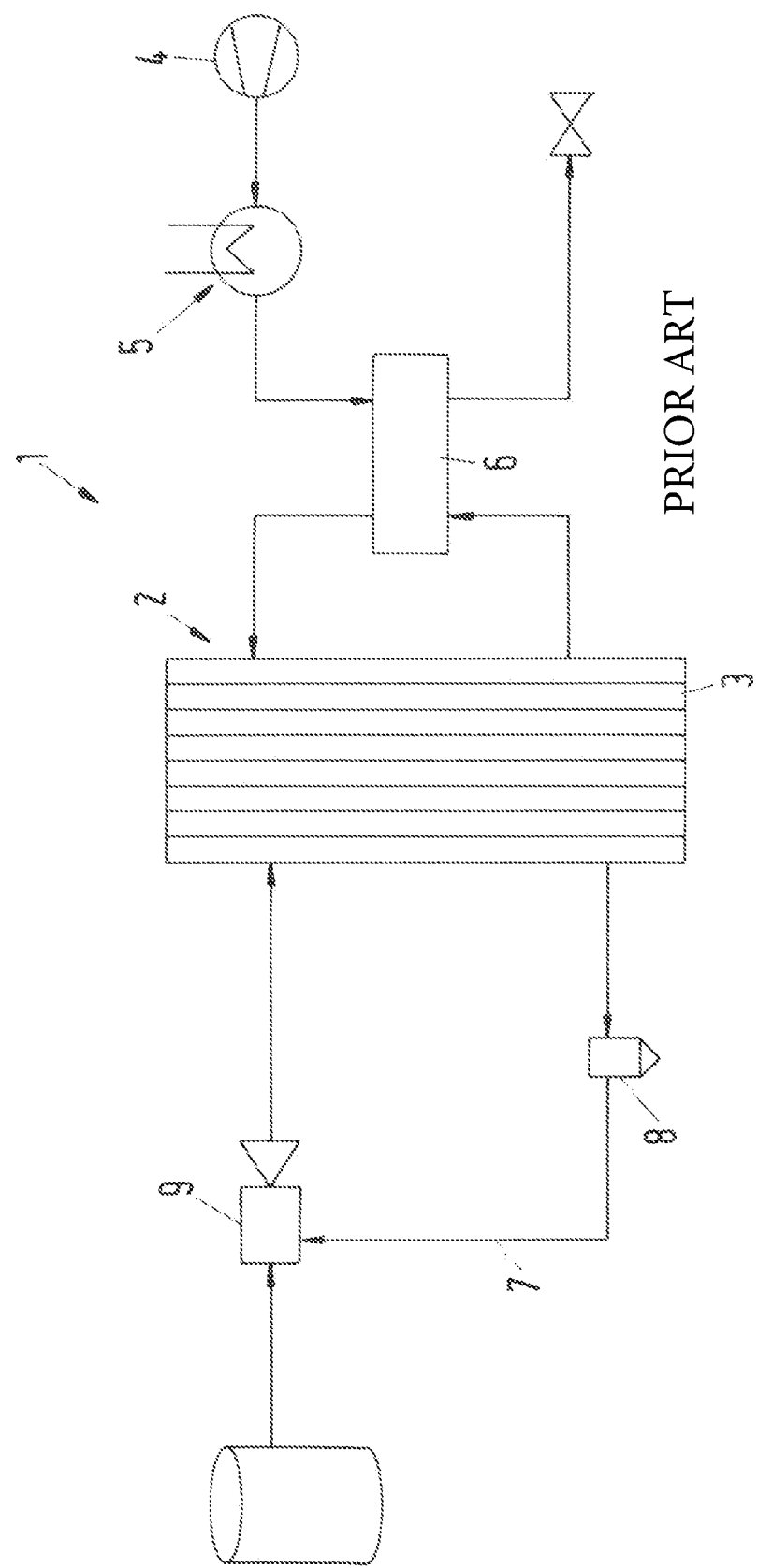
FIG. 9 shows a schematic representation of a fuel cell device known from the prior art with a fuel cell stack as well as a humidifier and anode circuit formed separately from the fuel cell stack.
Figure 11:
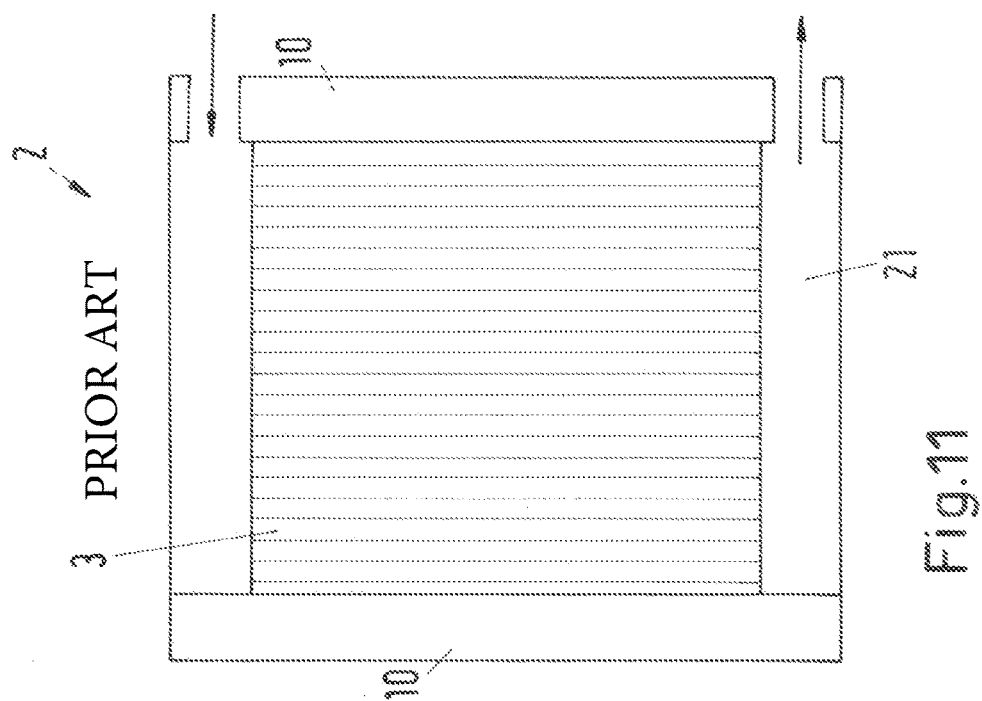
FIG. 11 shows a representation corresponding to FIG. 2 for the end plate according to FIG. 10.

FIG. 1 shows a first embodiment, in which the wall between the adjacent ports 12, 13 for the anode exhaust gas and the cathode fresh gas is formed by a hygroscopic material 20, the effect of which hygroscopic material is symbolized in FIG. 3. The cathode fresh gas is routed through the hygroscopic material 20 by the arrow pointing to the left, whereas the anode exhaust gas, symbolized by the case pointing to the right, is likewise routed through the hygroscopic material 20. The water transport from the anode exhaust gas through the hygroscopic material 20 into the cathode fresh gas is symbolized by the arrow pointing upwards and perpendicular to these flows, such that the waste water from the anode is used directly in the fuel cell stack 2 to humidify the cathode fresh gas and accordingly the humidifier 6 of the fuel cell device 1 according to FIG. 9, which is known from the prior art, can be made correspondingly smaller or, if necessary, can even be dispensed with completely. The hygroscopic material 20 is coupled with a seal 23 in a gas-tight manner as well as thermally to the end plate 10.

FIG. 2 shows the positioning of the hygroscopic material 20 in the flow interconnection of the end plates 10 with the main gas channels 21 (headers) for the supply of flow fields in the bipolar plates of the fuel cells 3.

Figure 4:
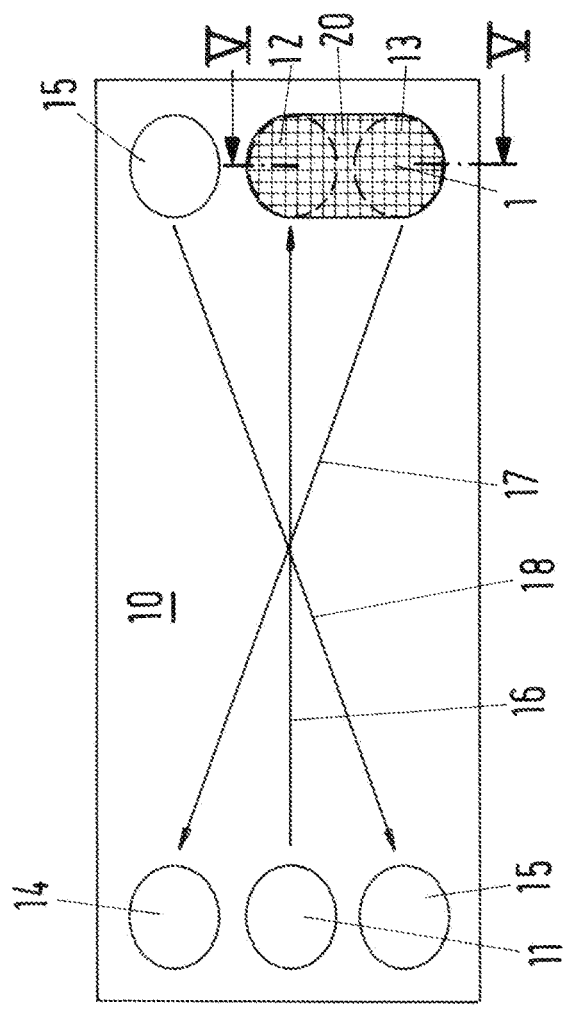
FIG. 4 shows a representation corresponding to FIG. 1 of an alternative embodiment with a flow channel for the anode exhaust gas and the cathode fresh gas comprising hygroscopic material.

FIG. 4 and FIG. 5 show an embodiment in which flow channels 19 for the anode exhaust gas and/or the cathode fresh gas are formed in a part of the cross-section of the hygroscopic material 20, which cross-section is dimensioned such that the pressure loss of the gas flows in the hygroscopic material 20 is kept within the required limits.

Figure 6:
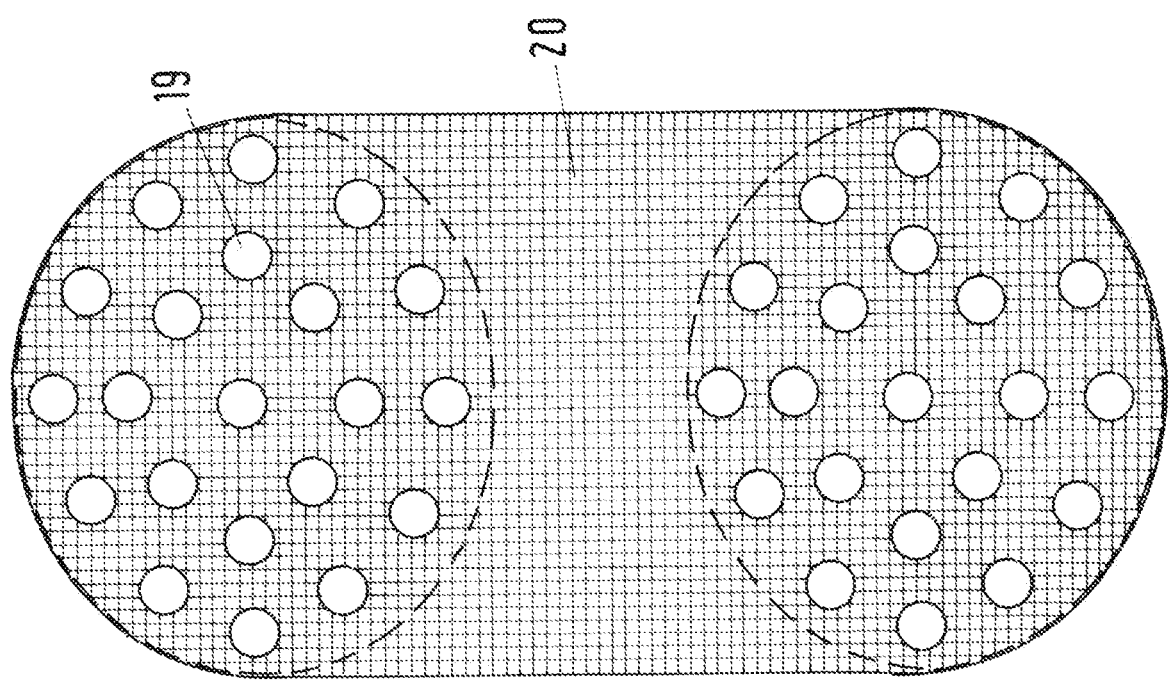
FIG. 6 shows a side view of the hygroscopic material showing the flow channels formed therein.
Figure 7:
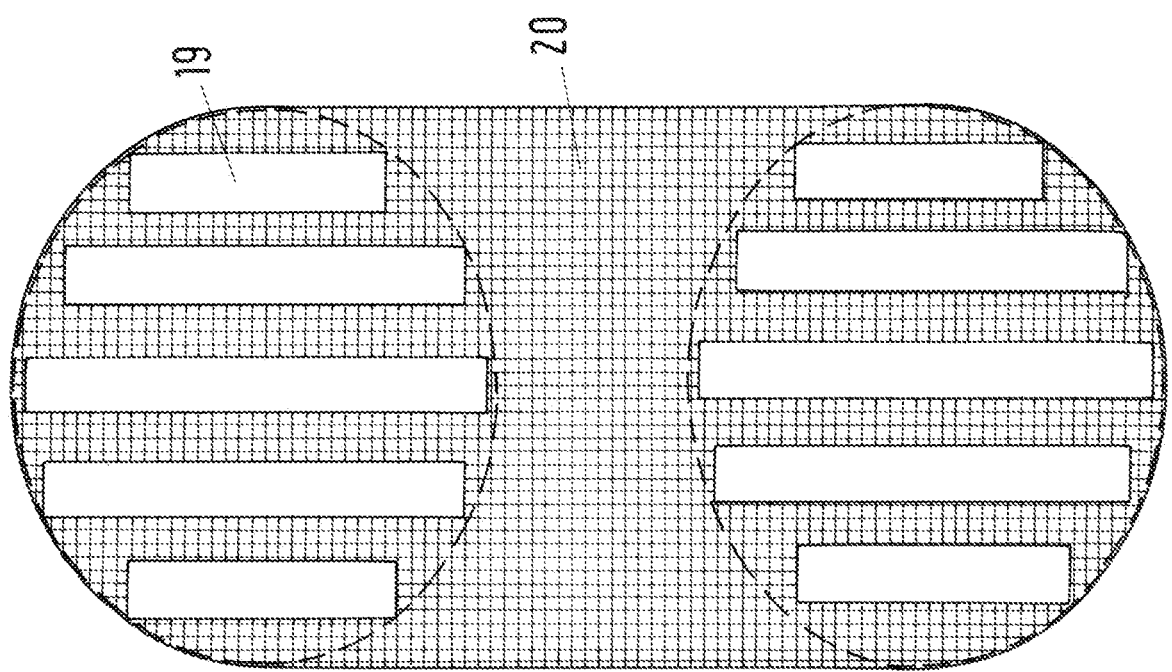
FIG. 7 shows a representation corresponding to FIG. 6 with an alternative shape of the flow channels.

FIG. 6 shows an embodiment in which there are multiple flow channels 19 with a circular cross-section, whereas FIG. 7 shows an embodiment in which there are also multiple flow channels 19 however with a rectangular cross-section.

Figure 8:
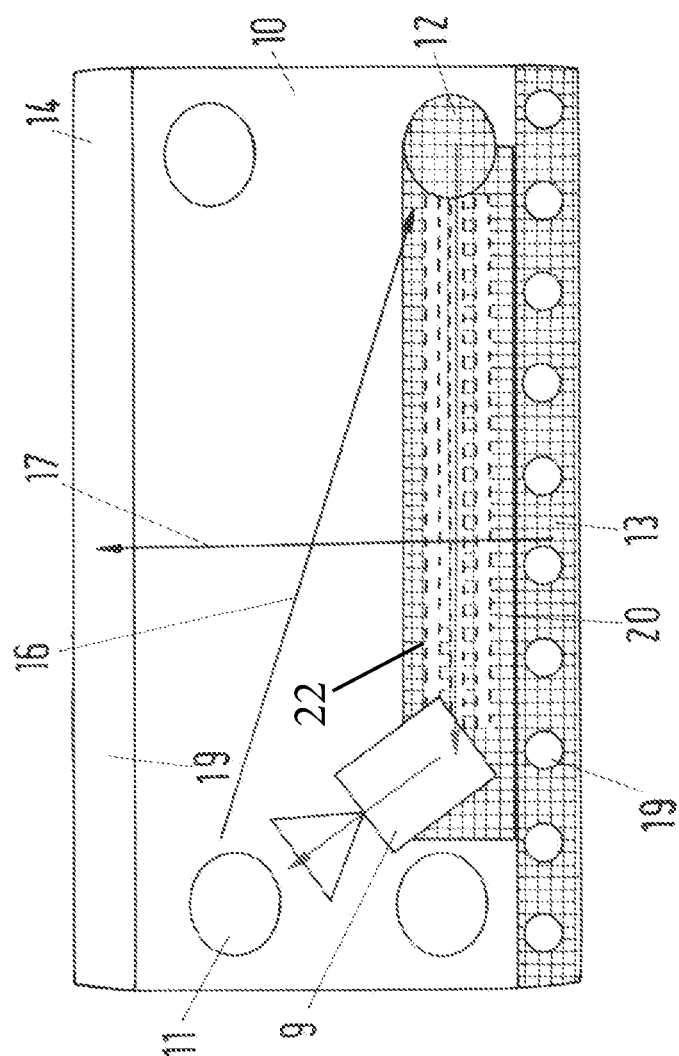
FIG. 8 shows a representation corresponding to FIG. 1 of a further embodiment with an anode circuit formed in the end plate.

FIG. 8 shows another embodiment in which the ports 13, 14 for the cathode fresh gas and the cathode exhaust gas are formed on opposite longitudinal sides of the end plate 10, wherein the hygroscopic material 20 extends parallel to the longitudinal side with the port 13 for the cathode fresh gas and at least partially fills a recycle channel 22 going from the port 12 for the anode exhaust gas to the port 11 for the anode fresh gas. A jet pump 9 is assigned to the recycle channel 22 such that an anode circuit 7 is implemented in the end plate 10, resulting in further savings in installation space.

Aspects of various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A fuel cell stack, comprising:
a first end plate and a second end plate; and
a plurality of fuel cells received between the first end plate and the second end plate;
wherein the first end plate includes flow channels with a first port for an anode fresh gas, a second port for an anode exhaust gas, a third port for a cathode fresh gas, and a fourth port for a cathode exhaust gas;
wherein a hygroscopic material forms a wall between the second port for the anode exhaust gas and the third port for the cathode fresh gas;
wherein the third port for the cathode fresh gas and the fourth port for the cathode exhaust gas are formed on opposite longitudinal sides of the first end plate; and
wherein the hygroscopic material extends parallel to a longitudinal side with the third port for the cathode fresh gas and at least partially fills a recycle channel going from the second port for the anode exhaust gas to the first port for the anode fresh gas.

2. The fuel cell stack according to claim 1, wherein the wall formed by the hygroscopic material is gas-tight.

3. The fuel cell stack according to claim 1, wherein the hygroscopic material is thermally coupled to the first end plate.

4. The fuel cell stack according to claim 1, wherein the third port for the cathode fresh gas and the second port for the anode exhaust gas are routed through the hygroscopic material.

5. The fuel cell stack according to claim 1, wherein, in the first end plate having the ports, a flow channel with associated ports for a coolant is formed.

6. The fuel cell stack according to claim 1, wherein flow channels for the anode exhaust gas and/or the cathode fresh gas are formed in part of the cross section of the hygroscopic material.

7. The fuel cell stack according to claim 1, wherein the first end plate is associated with a cover supporting the ports.

8. The fuel cell stack according to claim 1, wherein the hygroscopic material is sealed to the first end plate by a seal.

9. The fuel cell stack according to claim 1, wherein a jet pump is associated with the recycle channel.

* * * * *